(12) United States Patent
Kondula et al.

(10) Patent No.: US 12,038,905 B2
(45) Date of Patent: Jul. 16, 2024

(54) AUTOMATIC DATA RETRIEVAL AND VALIDATION

(71) Applicant: ADP, Inc., Roseland, NJ (US)

(72) Inventors: Chinnakondaiah Kondaiah Kondula, Pune (IN); Manish Kulkarni, Hyderabad (IN); Arun Kumar Tuli, Pune (IN)

(73) Assignee: ADP, Inc., Roseland, NJ (US)

( * ) Notice: Subject to any disclaimer, the term of this patent is extended or adjusted under 35 U.S.C. 154(b) by 142 days.

(21) Appl. No.: 17/655,037

(22) Filed: Mar. 16, 2022

(65) Prior Publication Data

US 2023/0297558 A1    Sep. 21, 2023

(51) Int. Cl.
*G06F 16/23* (2019.01)
*G06F 9/451* (2018.01)
*G06F 9/54* (2006.01)
*G06F 16/215* (2019.01)

(52) U.S. Cl.
CPC .......... *G06F 16/2365* (2019.01); *G06F 9/451* (2018.02); *G06F 9/54* (2013.01); *G06F 16/215* (2019.01)

(58) Field of Classification Search
None
See application file for complete search history.

(56) References Cited

U.S. PATENT DOCUMENTS

| | | | |
|---|---|---|---|
| 10,387,405 B2 * | 8/2019 | Doval | G06F 16/185 |
| 2017/0192705 A1 * | 7/2017 | Grube | G06F 11/3034 |
| 2017/0286188 A1 * | 10/2017 | Wang | H04L 67/01 |
| 2018/0276268 A1 * | 9/2018 | Doval | G06F 11/0751 |
| 2023/0185793 A1 * | 6/2023 | Farhi | H04L 63/123 707/690 |
| 2023/0297558 A1 * | 9/2023 | Kondula | G06F 9/00 707/690 |

* cited by examiner

*Primary Examiner* — Kim T Nguyen
(74) *Attorney, Agent, or Firm* — Foley & Lardner LLP (57) ABSTRACT

A method, apparatus, system, and computer program code for automatic data retrieval and validation. A computer system generates an audit file including a set of data objects. The computer system validates the data objects with a compliance policy by deploying a set of software bots to interact at a user level with a set of application programs. In response to validating the data objects, the computer system reflects validation results into a user interface.

21 Claims, 9 Drawing Sheets

GRAPHICAL USER INTERFACE 300

California Pay Statement Review

| Enter Case Number | Client Name | Client Start Date |
|---|---|---|
|  | Modern Clinics Inc | 11/11/21 |

| Company Code Released | If Active CA Employees | Review Date |
|---|---|---|
| 858 ▼ | 78 | 1/11/2022 |

IE

CHECKLIST 310

| Requirement | Pay Statement Check Points ⓘ | CCI | Employee 1 | Employee 2 | Employee 3 | Employee 4 | Employee 5 |
|---|---|---|---|---|---|---|---|
| 1 | Company Legal Name and Address: ⓘ | YES | YES ˅ | YES ˅ | YES ˅ | YES ˅ | YES ˅ |
| 2 | Pay Period Beginning and Ending Date: ⓘ | YES | YES ˅ | YES ˅ | YES ˅ | YES ˅ | YES ˅ |
| 3 | Last 4-digits of SSN ⓘ | N/A | YES ˅ | YES ˅ | YES ˅ | YES ˅ | YES ˅ |
| 4 | Employee Name ⓘ | N/A | YES ˅ | YES ˅ | YES ˅ | YES ˅ | YES ˅ |
| 5a | Rates of pay: ⓘ | YES | YES ˅ | YES ˅ | YES ˅ | YES ˅ | YES ˅ |
| 5b | Special Calculations: ⓘ | YES | YES ˅ | YES ˅ | YES ˅ | YES ˅ | YES ˅ |
| 6a | Prior Period Retro Pay: ⓘ Prior Period Overtime: ⓘ | N/A | NA ˅ | NA ˅ | NA ˅ | NA ˅ | YES ˅ |
| 6b | Prior Period Retro Pay: ⓘ | N/A | NA ˅ | NA ˅ | NA ˅ | NA ˅ | NA ˅ |
| 6c | Prior Period Overtime: ⓘ | N/A | YES ˅ | YES ˅ | YES ˅ | YES ˅ | YES ˅ |
| 7 | Gross Pay: ⓘ | YES | YES ˅ | YES ˅ | YES ˅ | YES ˅ | YES ˅ |
| 8 | Deductions: ⓘ | YES | YES ˅ | YES ˅ | YES ˅ | YES ˅ | YES ˅ |
| 9 | Net pay: ⓘ | YES | NO ˅ | NO ˅ | NO ˅ | NO ˅ | NO ˅ |
| 10 | Total Hours Worked: ⓘ | Displayed | Hourly ˅ | Hourly ˅ | Hourly ˅ | Hourly ˅ | Hourly ˅ |
| 11 | Sick Hours Available ⓘ |  |  |  |  |  |  |
| Additional | Basis of Pay: ⓘ |  |  |  |  |  |  |
| Accuracy % |  |  |  |  |  |  |  |

Employee Information

| Client ID | | Parent Company Code | | | | | 93% Accuracy |
|---|---|---|---|---|---|---|---|
| Elemy | | LBU | | | | | |
| Reviewer Name | | HRS | | | | | |

| | | Sample Employee Information | | • Company Name | |
|---|---|---|---|---|---|
| Accuracy Requirement Mat | Category | Explanatory Comments | | | Remediation Notes |
| 100% | YES | Category 1 ˅ | Lorem ipsum dolor sit amet, consectetur adipiscing elit, sed | | Enter ... |
| 100% | YES | Category 1 ˅ | | | Enter ... |
| 100% | YES | Category 1 ˅ | | | Enter ... |
| 100% | YES | Category 1 ˅ | Enter ... | | Enter ... |
| 100% | YES | Category 1 ˅ | Enter ... | | Enter ... |
| 100% | YES | Category 1 ˅ | Lorem ipsum dolor sit amet, consectetur adipiscing elit, sed | | Enter ... |
| 100% | YES | Category 1 ˅ | Lorem ipsum dolor sit amet, consectetur adipiscing elit, sed | | Enter ... |
| 40% | YES | Category 1 ˅ | Enter ... | | Enter ... |
| 0% | YES | Category 1 ˅ | Enter ... | | Enter ... |
| 100% | YES | Category 1 ˅ | | | Enter ... |
| 100% | YES | Category 1 ˅ | | | Enter ... |
| 100% | YES | Category 1 ˅ | | | Enter ... |
| 100% | YES | Category 1 ˅ | | | Enter ... |
| 0% | NO | Category 1 ˅ | | | Enter ... |
| 93% | | | | | |

(Save) (Export To Excel)

FROM FIG. 3A

CA PayStatement Review

Monthwise Volume
Last 3 months

| Overall Clients | Overall Co Codes |
|---|---|
| 447 | 813 |

Request Type
☐ Go Live-Co Codes  ☐ Henry (Adhoc)-Co...

| CA Clients | CA Co Codes | Go Live - Co Codes | Henry (Adloc) - C Codes |
|---|---|---|---|
| 212 | 282 | 155 | 75 |

Monthwise Client/Co Code Metric
Comp Codes. ▼

Monthwise Volume of Comp. Codes.

| | | Reaudit Codes |
|---|---|---|
| Aug | 65 / 300 | |
| Sep | 369 | 28 |
| Oct | 70 | |

IS Metric
IE (IS Manager) ▼

CCI Review Success %
85%

IE (IS Manager)
- Deb Dell — 92.0%
- Jim Smith — 85.3%
- Jeff Ben — 76.6%
- Kim Shaw — 75.0%
- Lori Duff — 72.0%
- Rob Beno — 72.0%
- Thom Red — 67.6%
- Don Scott — 67.3%
- Dave Tan — 51.0%
- — 43.0%

Paystub Review Success %
85%

CCI Review % - Checkpoint Level

| Company Legal Name and Address | Pay Period Beginning and Ending Date | Last 4-digits of SSN | Special Calculations | Prior Period Retro Pay |
|---|---|---|---|---|
| 82% | 100% | 100% | 62% | 51% |

| Deductions | Net pay | Total Hours Worked | Sick Hours Available | Temporary Service Employers | Bank Name and Address | Basis of Pay |
|---|---|---|---|---|---|---|
| 99% | 100% | 57% | 93% | 0% | 91% | 98% |

Paystub Review % - Checkpoint Level

| Company Legal Name and Address | Pay Period Beginning and Ending Date | Last 4-digits of SSN | Employee Name | Rates of pay | Special Calculations | Prior Period Retro Pay | Prior Period Overtime | Gross Pay |
|---|---|---|---|---|---|---|---|---|
| 85% | 100% | 98% | 100% | 83% | 71% | 71% | 0% | 100% |

| Deductions | Net pay | Total Hours Worked | Sick Hours Available | Piecework | Commission | Temporary Service Employers | Bank Name and Address | Employees of Garment Manufacturers | Basics of Pay |
|---|---|---|---|---|---|---|---|---|---|
| 100% | 100% | 73% | 29% | 0% | 100% | 0% | 0% | 98% | 0% |

410 — VALIDATION RESULTS

400 — GRAPHICAL USER INTERFACE

AUTOMATIC DATA RETRIEVAL AND VALIDATION

BACKGROUND

1. Field

The disclosure relates generally to an improved computer system and, more specifically, to a method, apparatus, computer system, and computer program product for performing automatic data retrieval and validation.

2. Description of the Related Art

Data quality refers to the state of qualitative or quantitative pieces of information. Data quality measures the condition of data based on factors such as accuracy, completeness, consistency, reliability, and whether the data is up to date. Data is generally considered high quality if it correctly represents the real-world construct to which it refers and is intended to be used in operations, decision making, planning, and compliance to an application data model and storage format, e.g., all data is accurate and there are no missing connections between tables. Data quality is a concern for information systems including, e.g., data warehousing, business intelligence, custom relationship management, and supply chain management. As the number of data sources increases, internal data consistency becomes more difficult to maintain.

The emphasis on data quality in company systems has increased as data processing has become increasingly linked with business operations and the use of data analytics to help with business decisions. Poor-quality data can be a source of operational errors, resulting in economic damage, as well liability and credibility issues.

Therefore, it would be desirable to have a method and apparatus that take into account at least some of the issues discussed above, as well as other possible issues.

SUMMARY

According to one embodiment of the present invention, a method provides for automatic data retrieval and validation. The method includes the steps of: generating, by a computer system, an audit file including a set of data objects; validating, by the computer system, the data objects with a compliance policy by deploying a set of software bots to interact at a user level with a set of application programs; and in response to validating the data objects, reflecting, by the computer system validation results into a user interface.

According to another embodiment of the present invention, a computer system comprises a hardware processor and a validation engine in communication with the hardware processor. The validation engine is configured to execute program code for generating an audit file including a set of data objects; validating the data objects with a compliance policy by deploying a set of software bots to interact at a user level with a set of application programs; and in response to validating the data objects, reflecting validation results into a user interface.

According to yet another embodiment of the present invention, a computer program product comprises a computer-readable storage media with program code stored on the computer-readable storage media for automatic data retrieval and validation. The program code is executable by a computer system to perform the method of: generating an audit file including a set of data objects; validating the data objects with a compliance policy by deploying a set of software bots to interact at a user level with a set of application programs; and in response to validating the data objects, reflecting validation results into a user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
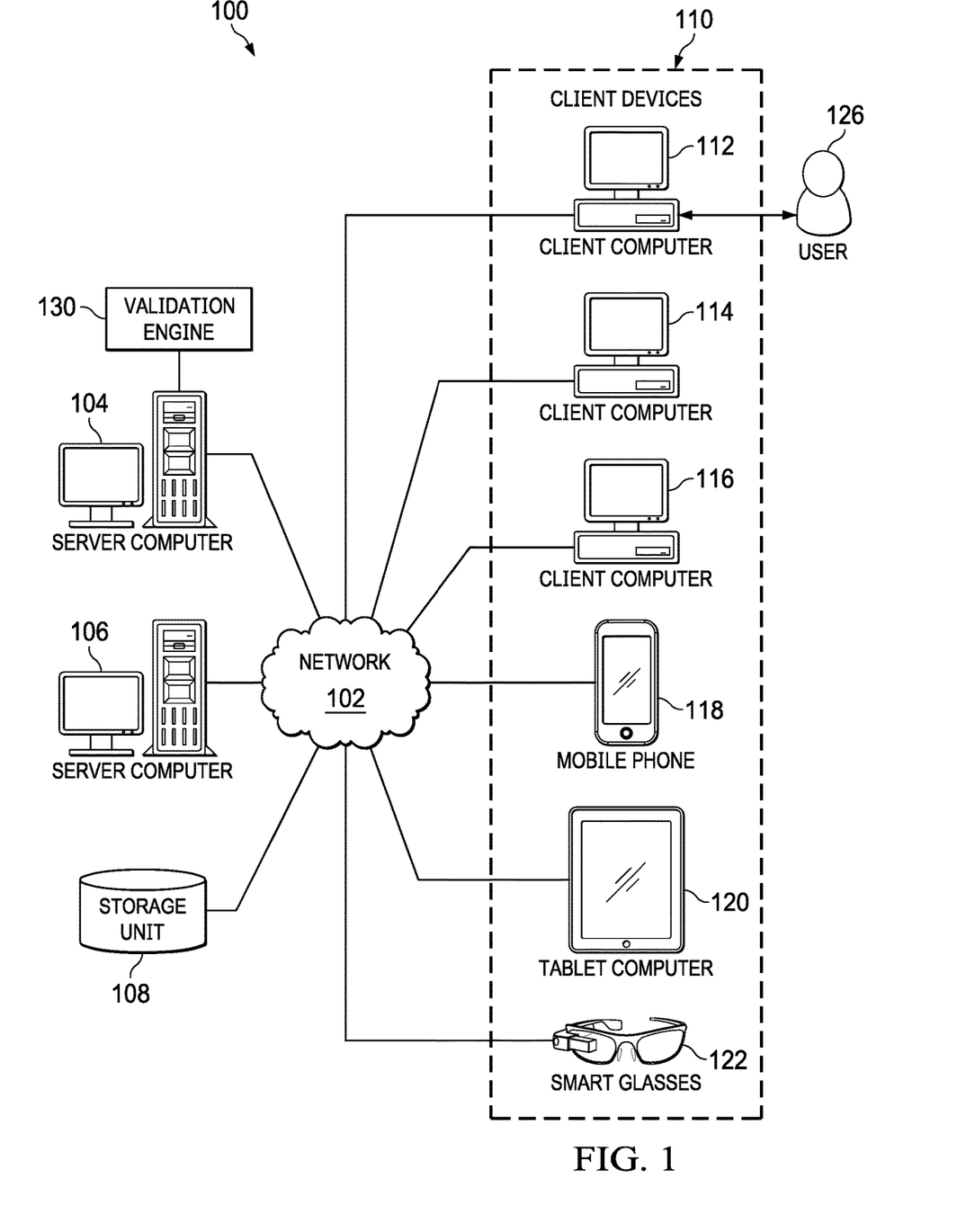
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, validation engine 130 can run on server computer 104. In another illustrative example, validation engine 130 can be run in a remote location such as on client computer 114 and can take the form of a system instance of the application. In yet other illustrative examples, validation engine 130 can be distributed in multiple locations within network data processing system 100. For example, validation engine 130 can run on client computer 112 and on client computer 114 or on client computer 112 and server computer 104 depending on the particular implementation.

Figure 2:
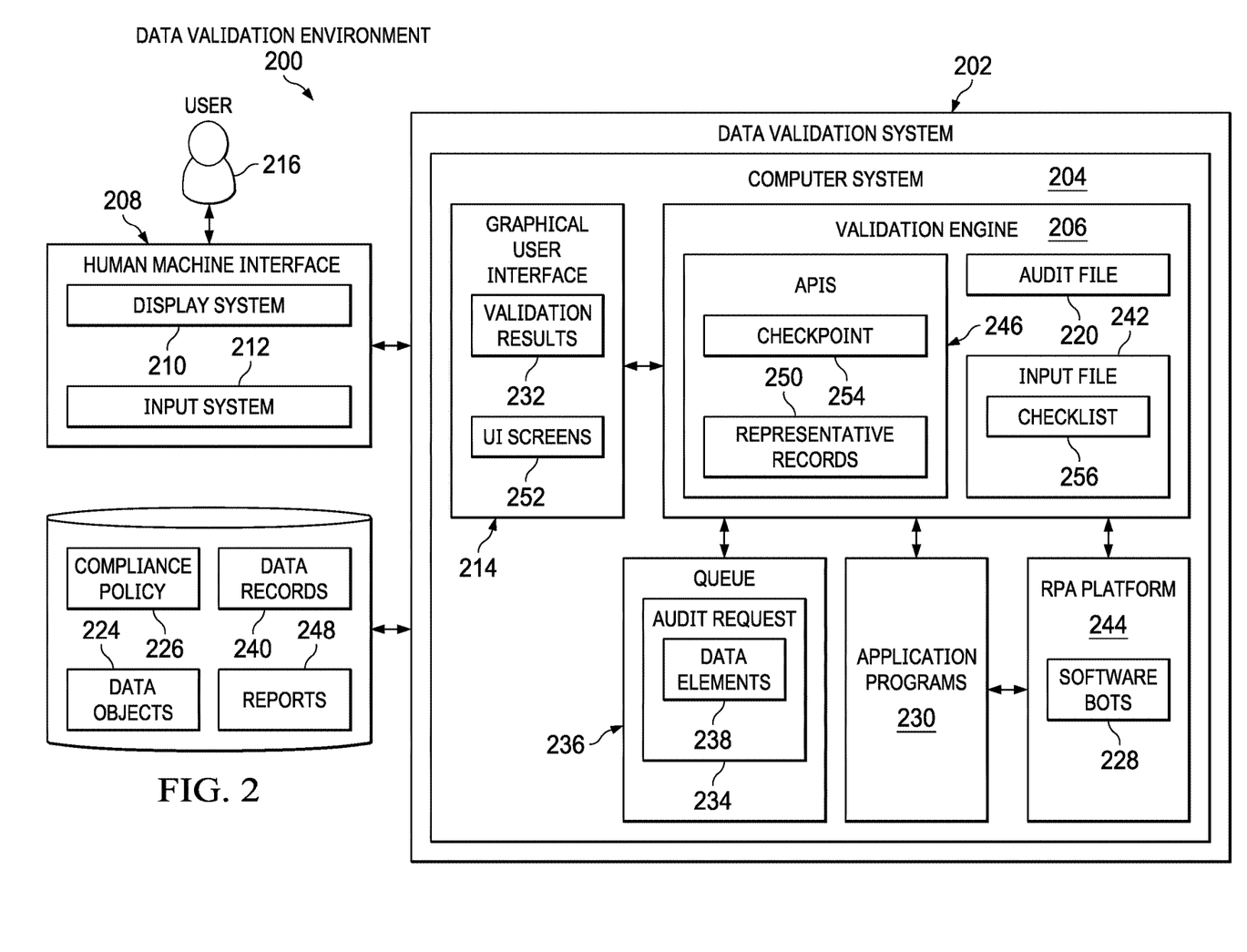
FIG. 2 is a block diagram of a data validation environment in accordance with an illustrative embodiment.

With reference now to FIG. 2, a block diagram of a data validation environment is depicted in accordance with an illustrative embodiment. In this illustrative example, data validation environment 200 includes components that can be implemented in hardware such as the hardware shown in network data processing system 100 in FIG. 1.

As depicted, data validation system 202 comprises computer system 204 and validation engine 206. Validation engine 206 runs in computer system 204. validation engine 206 can be implemented in software, hardware, firmware, or a combination thereof. When software is used, the operations performed by validation engine 206 can be implemented in program code configured to run on hardware, such as a processor unit. When firmware is used, the operations performed by validation engine 206 can be implemented in program code and data and stored in persistent memory to run on a processor unit. When hardware is employed, the hardware may include circuits that operate to perform the operations in validation engine 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In one or more illustrative embodiments, graphical user interface 214 solves problems of prior graphical user interface devices (GUIs), in the context of data validation, relating to speed, accuracy, and usability. Rather than reciting a mathematical algorithm, a fundamental economic or longstanding commercial practice, or a challenge in business, graphical user interface 214 improves on existing graphical user interface devices that do not utilize validation engine 206. The embodiments of graphical user interface 214 provide significantly more than prior graphical user interface devices that merely allow for setting, displaying, and selecting data or information that is visible on a graphical user interface device. Instead, graphical user interface 214 utilizes a specific, structured interface directly related a prescribed functionality that resolves a specifically identified problem of automatic data retrieval and validation.

Furthermore, the specific structure and concordant functionality of graphical user interface 214 distinguishes this system as compared to conventional computer implementations of known procedures. The function of graphical user interface 214 is not simply the generalized use of computer system 204 as a tool to conduct a known or obvious process. Instead, graphical user interface 214 provides an inventive concept that allows for automatic data retrieval and validation. Rather than the routine or conventional use of computers or the Internet, graphical user interface 214 overcomes problems that are necessarily rooted in computer technology and that specifically arise in the realm of computer networks, resulting in an improvement to the capabilities of data validation system 202.

In this illustrative example, human machine interface 208 can enable user 216 to interact with one or more computers or other types of computing devices in computer system 204. For example, these computing devices can be client devices such as client devices 110 in FIG. 1.

In this illustrative example, validation engine 206 in computer system 204 is configured to perform methods for automatic data retrieval and validation. validation engine 206 generates audit file 220 including a set of data objects 224. Validation engine 206 validates data objects 224 against a compliance policy 226.

Compliance policy 226 is a set of that define information that is to be included in data objects 224. Compliance policy 226 may be provided as a regulation or statute that establishes standards related to the information included in data objects 224.

In this illustrative example, validation engine 206 validates data objects 224 by deploying a set of software bots 228 in robotic process automation (RPA) platform 244. Software bots 228 are software constructs that enable the capture and interpretation of existing applications for processing a transaction, manipulating data, triggering responses, and communicating with other digital systems. Software bots 228 in RPA platform 244 interpret the user interface screens 252 of application programs 230 to execute commands in graphical user interface 214 identically to user 216. That is, software bots 228 operate at an application level as a human user would engage with such applications, for example, by invoking control elements within graphical user interface 214.

In response to validating the data objects 224, validation engine 206 reflects validation results 232 into graphical user interface 214. Validation engine 206 thereby provides user 216 with visual confirmation of validation results 232 for data objects 224 against compliance policy 226.

In one illustrative example, validation engine 206 generates the audit file in response to receiving an audit request 234. Validation engine 206 identifies audit request 234 from queue 236. Validation engine 206 identifies data elements 238 in audit request 234. Data elements 238 may provide an indication of one or more data records 240 that can be used to verify data objects 224.

Data records 240 are data generated by one or more application programs 230. In this illustrative example, validation engine 206 queries at least one of the application programs 230 for a set of data records 240. Each data record in the set of data records 240 includes the data elements 238 identified from audit request 234. Validation engine 206 packages the set of data records 240 into an input file 242 for RPA platform 244.

In one illustrative example, validation engine 206 may identify data records 240 using one or more software bots 228 of RPA platform 244 and Application programming interfaces (APIs) 246. For example, validation engine 206 may use RPA platform 244 when an API is not configured to retrieve data records 240 from one or more of application programs 230. in this illustrative example, validation engine 206 may determine whether one or more of APIs 246 is configured to identify an audit request 234, identify data elements 238 in audit request 234, query application programs 230, or package set of data records 240 into input file 242. Validation engine 206 may use one or more of APIs 246 to issue a set of API calls to one or more of the application programs 230 to perform any of these actions for which APIs 246 are configured. Validation engine 206 may use one or more software bots 228 to interact with the set of application programs 230 to perform any of these actions for which APIs 246 are not configured.

In one illustrative example, validation engine 206 may validate compliance with compliance policy 226 by determining compliance for a number of representative records 250 a number of representative records 250. Each of representative records comprises a different combination of data dimensions, such that each representative records 250 may relate to different aspects of compliance policy 226.

In this illustrative example, validation engine 206 generates instructions for the set of software bots 228 to interact with the set of application programs 230 to perform a pre-audit of data records 240. Software bots 228 query the set of application programs 230 for the data records 240 and reports 248 that include the data elements 238 identified from audit request 234. Validation engine 206 then identifies representative records 250 based on different combinations of data dimensions returned in the query response.

Once representative records 250 are identified, validation engine 206 uses software bots 228 to query the application programs 230 for data objects 224 related to the representative records 250. Validation engine 206 then applies compliance policy 226 to validate compliance of the data objects 224 with compliance policy 226. Validation engine 206 reflects compliance of the data objects 224 into the user interface 214 as validation results 232.

In one illustrative example, validation engine 206 generates instructions for the set of software bots 228 to interact with the set of application programs 230 to perform a runtime-audit of data records 240. Software bots 228 navigate between UI screens 252 of the application programs 230, extracting data records 240 from UI screens 252.

Validation engine 206 performs checkpoint 254 validations for the data records 240 that were extracted. Validation engine inserts a checklist 256 of the checkpoints 254 validation into input file 242 for an RPA platform 244.

In one illustrative example, validation engine 206 marks each checkpoint 254 as completed or exception based on the processing. In response to successful validation, validation engine 206 generates instructions for the set of software bots 228 to interact with the set of application programs 230 to assign the audit file 220 to a user 216 for manual review.

Computer system 204 can be configured to perform at least one of the steps, operations, or actions described in the different illustrative examples using software, hardware, firmware, or a combination thereof. As a result, computer system 204 operates as a special purpose computer system in validation engine 206 in computer system 204. In particular, validation engine 206 transforms computer system 204 into a special purpose computer system as compared to currently available general computer systems that do not have validation engine 206. In this example, computer system 204 operates as a tool that can increase at least one of speed, accuracy, or usability of computer system 204. In one illustrative example, validation engine 206 provides for increased comprehension and speed at data can be retrieved and validated as compared with using current documentation systems.

The illustration of data validation environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Data validation environment 200 in FIG. 2 can be used to implement a number of different use cases for validating data with respect to different compliance policies. For example, California recently introduced revised pay statement compliance legislation. Under California law, specific pieces of information must appear on an employee's pay statement to remain compliant and avoid penalties.

By employing data validation environment 200 of FIG. 2, a solution can be effectuated that reduces the number of errors in the pay slip generated by using a combination of robotic process automation, and console applications working that a company level configuration using multiple payroll and human capital management software applications.

In a three-staged process, Data validation environment 200 enables end to end automation of audit processes in payroll applications, reducing average handling time by human operators through leveraging multiple application programming interfaces. For the Paystub Audit, data validation environment 200 creates Pay Stub Employee samples for the Pay Stub Audit process. Finally, a Consolidated Checklist can be pulled through the UI. Key performance indicators and analytics are displayed on a graphical user interface.

Figure 3A:
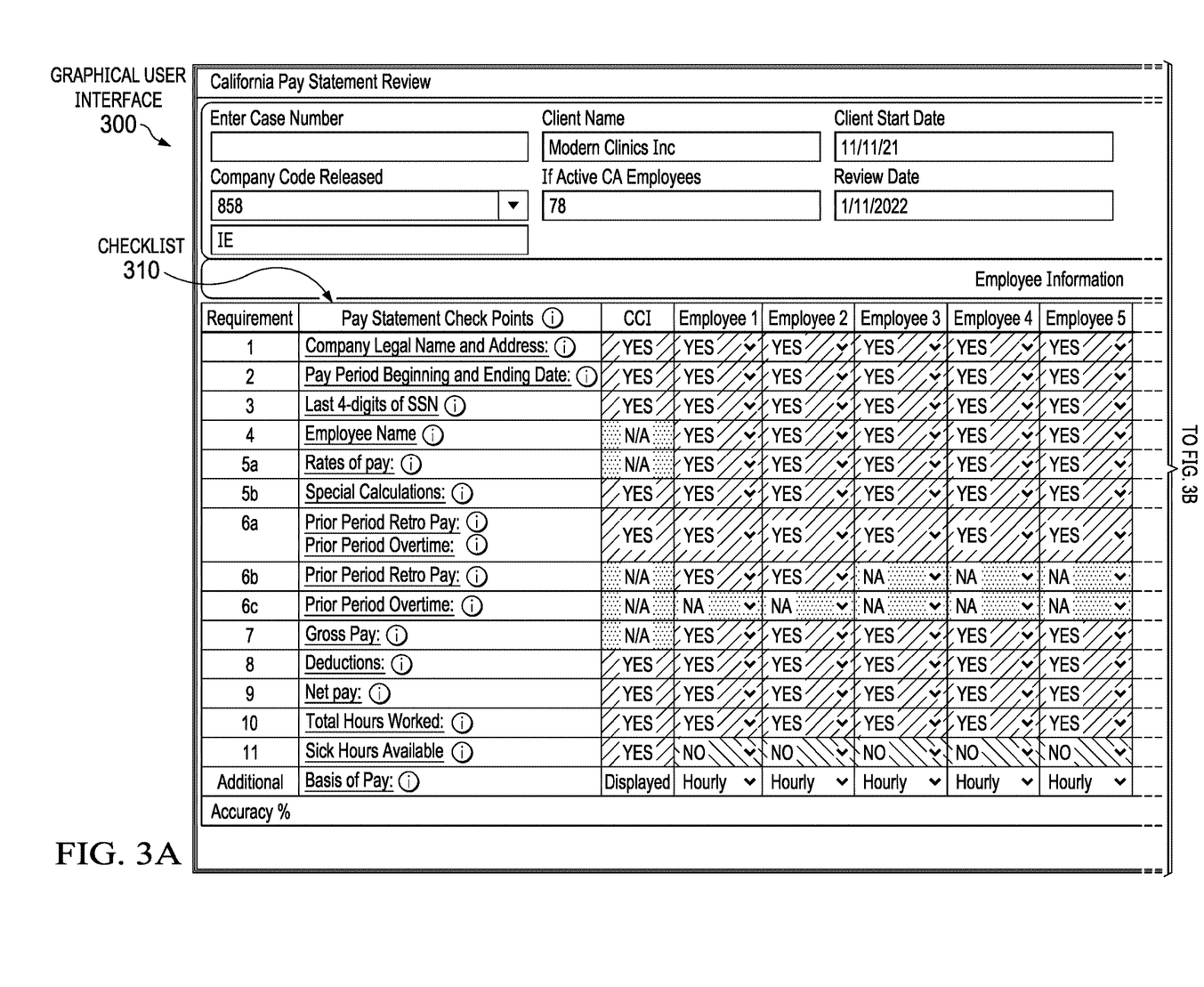
FIG. 3A is a graphical user interface displaying a first portion of a checklist depicted in accordance with an illustrative embodiment.
Figure 3B:
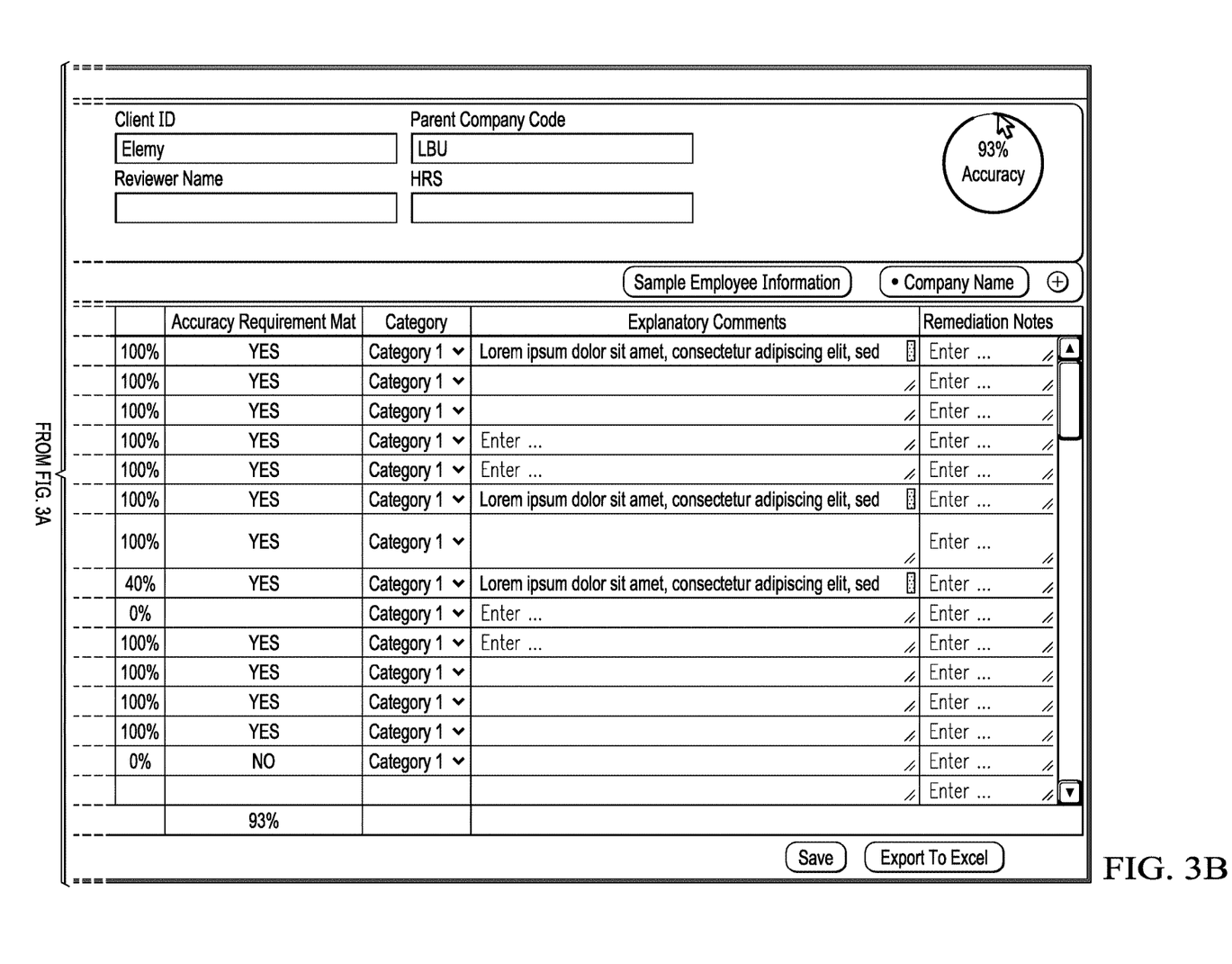
FIG. 3B is a graphical user interface displaying a second portion of a checklist depicted in accordance with an illustrative embodiment.
Figure 4:
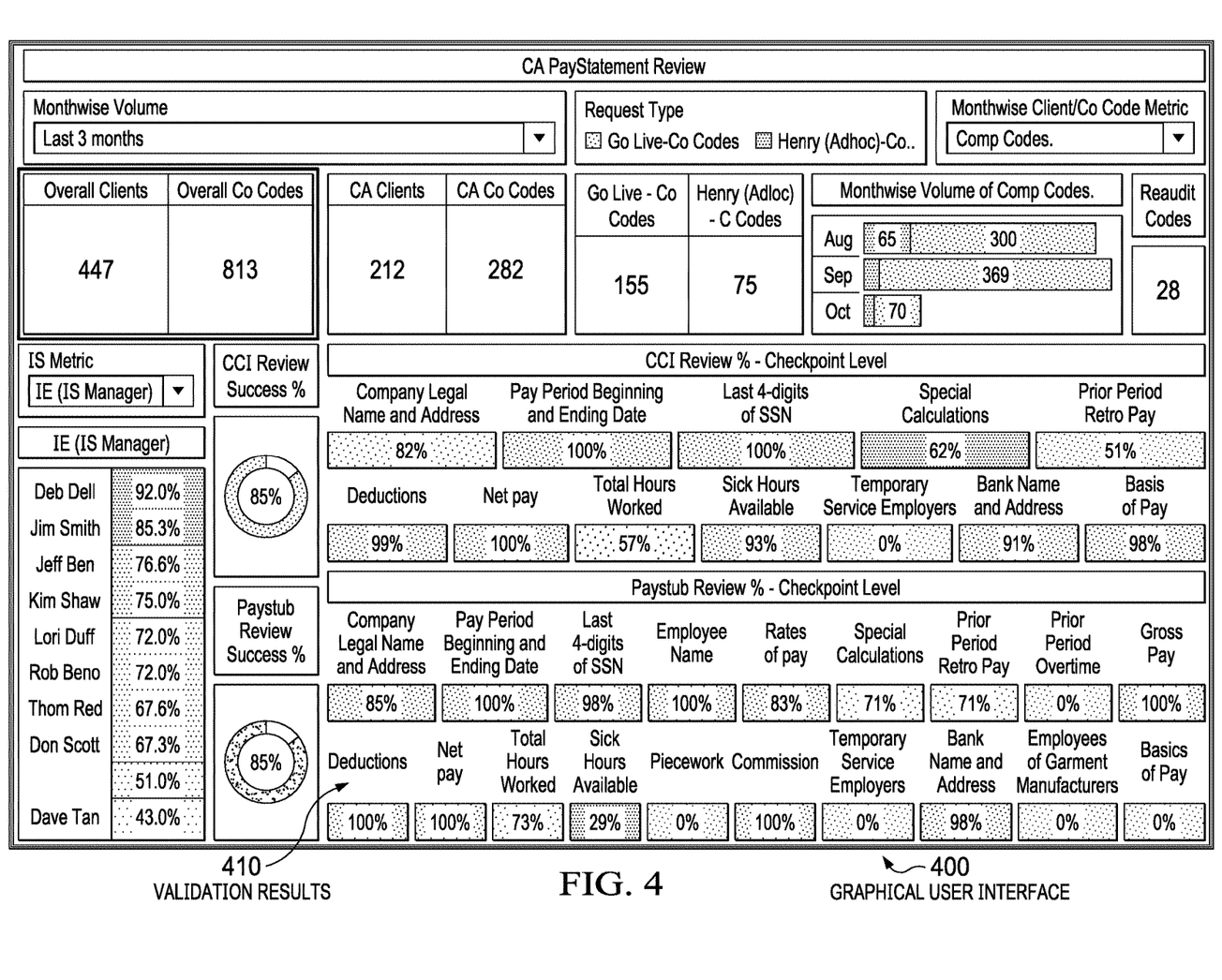
FIG. 4 is a graphical user interface displaying validation results depicted in accordance with an illustrative embodiment.

Turning now to FIGS. 3-4, illustrations of a graphical user interface are depicted for a particular use case in accordance with an illustrative embodiment. With reference to FIGS. 3A and 3B, a graphical user interface displaying a checklist is depicted in accordance with an illustrative embodiment.

As depicted, graphical user interface 300 is an example one implementation for graphical user interface 214 in FIG. 2. Checklist 310 is an example one implementation for checklist 256 in FIG. 2. Checklist 256 can be packaged into an input file, such as input file 242 of FIG. 2, for configuring one or more software bots of an RPA platform, such as software bots 228 and RPA platform 244 of FIG. 2.

With reference to FIG. 4, a graphical user interface displaying validation results is depicted in accordance with an illustrative embodiment. As depicted, graphical user interface 400 is an example one implementation for graphical user interface 214 in FIG. 2. Validation results 410 is one example of validation results 232 of FIG. 2. Validation results 410 can be displayed in graphical user interface 214 as visual confirmation of compliance of data objects with a compliance policy, such as data objects 224 and compliance policy 226 of FIG. 2.

The illustrations of graphical user interface in FIGS. 3-4 are provided as one illustrative example of an implementation for automatic data retrieval and validation and are not meant to limit the manner in which automatic data retrieval and validation can be generated and presented in other illustrative examples.

Figure 5:
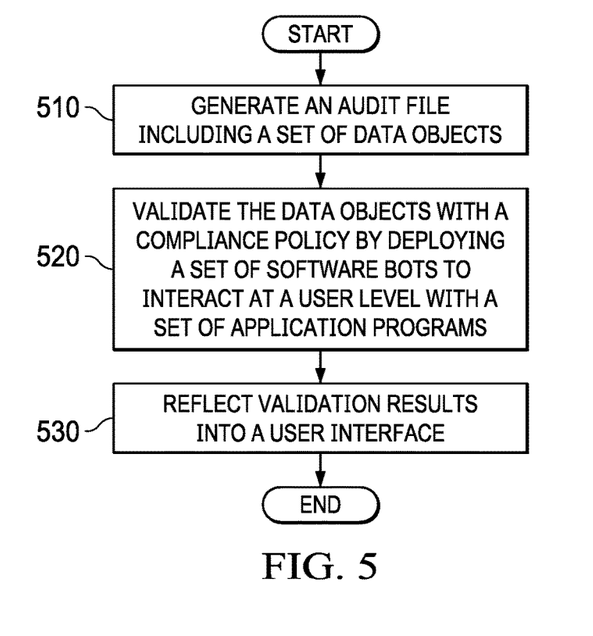
FIG. 5 is a flowchart of a process for automatic data retrieval and validation depicted in accordance with an illustrative embodiment.

Turning next to FIG. 5, a flowchart of a process for automatic data retrieval and validation is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in validation engine 206 in computer system 204 in FIG. 2.

The process begins by generating an audit file including a set of data objects (step 510). The process validates the data objects with a compliance policy by deploying a set of software bots to interact at a user level with a set of application programs (step 520).

In response to validating the data objects, the process reflects validation results into a user interface (step 530). Thereafter, the process terminates.

Figure 6:
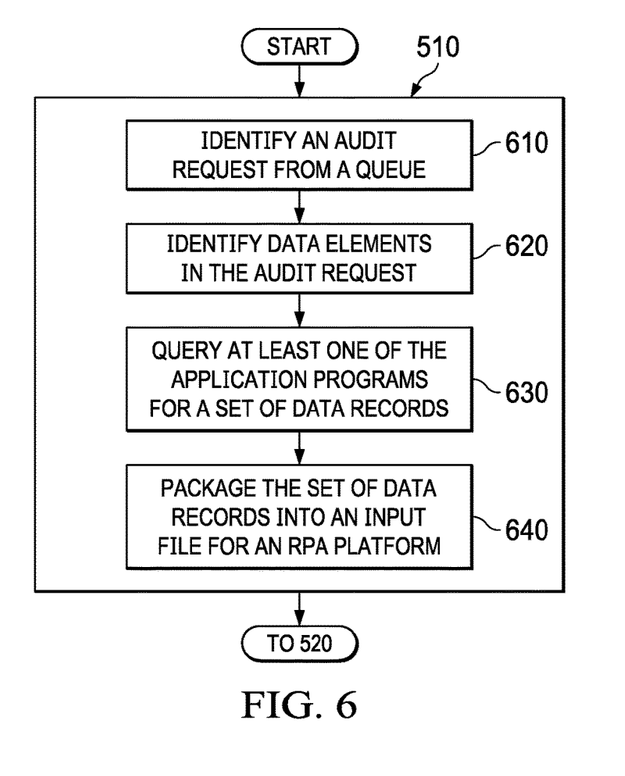
FIG. 6 is a flowchart of a process for generating an audit file depicted in accordance with an illustrative embodiment.

With reference next to FIG. 6, a flowchart of a process for generating an audit file is depicted in accordance with an illustrative embodiment. The process in FIG. 6 is an example one implementation for step 510 in FIG. 5.

In this illustrative example, the process generates the audit file by identifying an audit request from a queue (step 610). The process identifies data elements in the audit request (step 620). The process queries at least one of the application programs for a set of data records (step 630). Each data record in the set of data records includes the data elements identified from audit request. The process packages the set of data records into an input file for an RPA platform (step 640). Thereafter, the process may continue to step 520 of FIG. 5.

Figure 7:
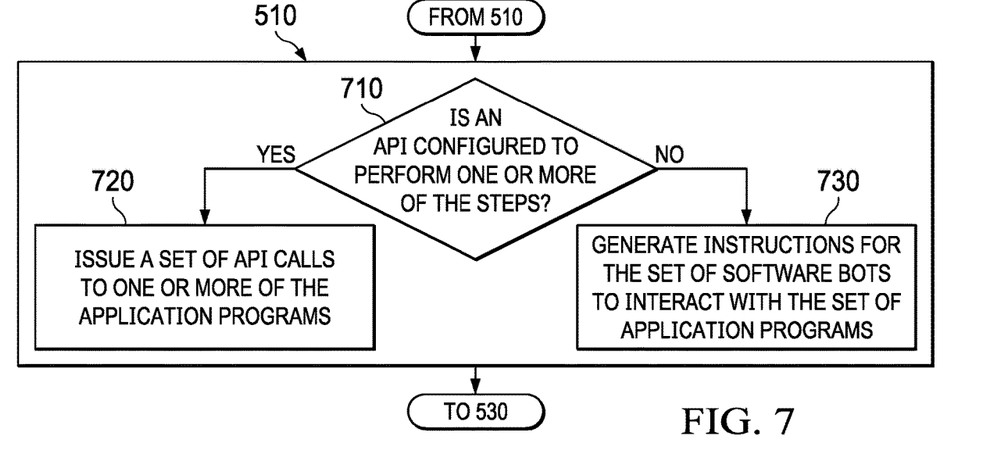
FIG. 7 is a flowchart of a process for generating an audit file depicted in accordance with an illustrative embodiment.

With reference next to FIG. 7, a flowchart of a process for generating an audit file is depicted in accordance with an illustrative embodiment. The process in FIG. 7 is an example one implementation for step 520 in FIG. 5.

Continuing from step 510 of FIG. 5, the process determines whether an API is configured to perform one or more of the steps of identifying the audit request, identifying the data elements, querying the application programs, and packaging the set of data records (step 710). In response to determining that the API is configured ("yes" at step 710), the process issues a set of API calls to one or more of the application programs to perform the one or more steps (step 720). However, in response to determining that the API is not configured ("no" at step 710), the process generates instructions for the set of software bots to interact with the set of application programs to perform the one or more steps (step 730). Thereafter, the process may continue to step 530 of FIG. 5.

Figure 8:
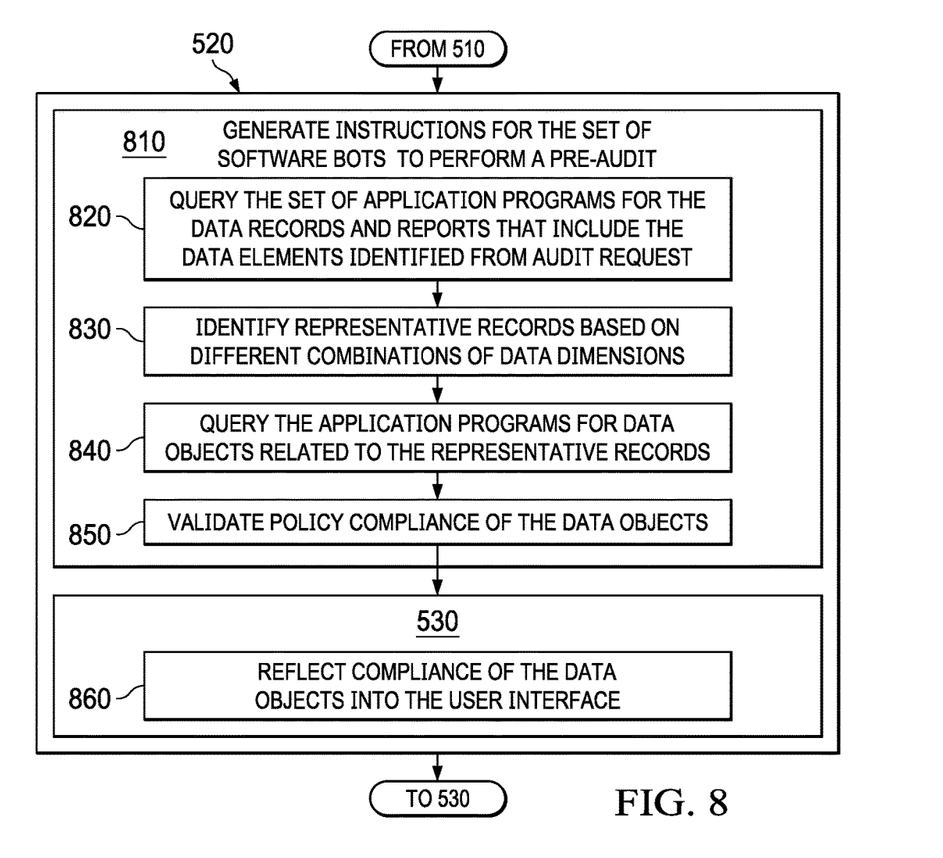
FIG. 8 is a flowchart of a process for validating policy compliance depicted in accordance with an illustrative embodiment.

With reference next to FIG. 8, a flowchart of a process for validating policy compliance is depicted in accordance with an illustrative embodiment. The process in FIG. 8 is an example one implementation for step 520 in FIG. 5.

Continuing from step 510 of FIG. 5, the process generates instructions for the set of software bots to interact with the set of application programs to perform a pre-audit (step 810). In this illustrative example, the instructions for the set of software bots include: querying the set of application programs for the data records and reports that include the data elements identified from audit request (step 820); identifying representative records based on different combinations of data dimensions (step 830); and querying the application programs for data objects related to the representative records (step 840). The process validates policy compliance of the data objects (step 850), and reflects compliance of the data objects into the user interface (step 860) as part of the validation results of FIG. 5. Thereafter, the process terminates.

Figure 9:
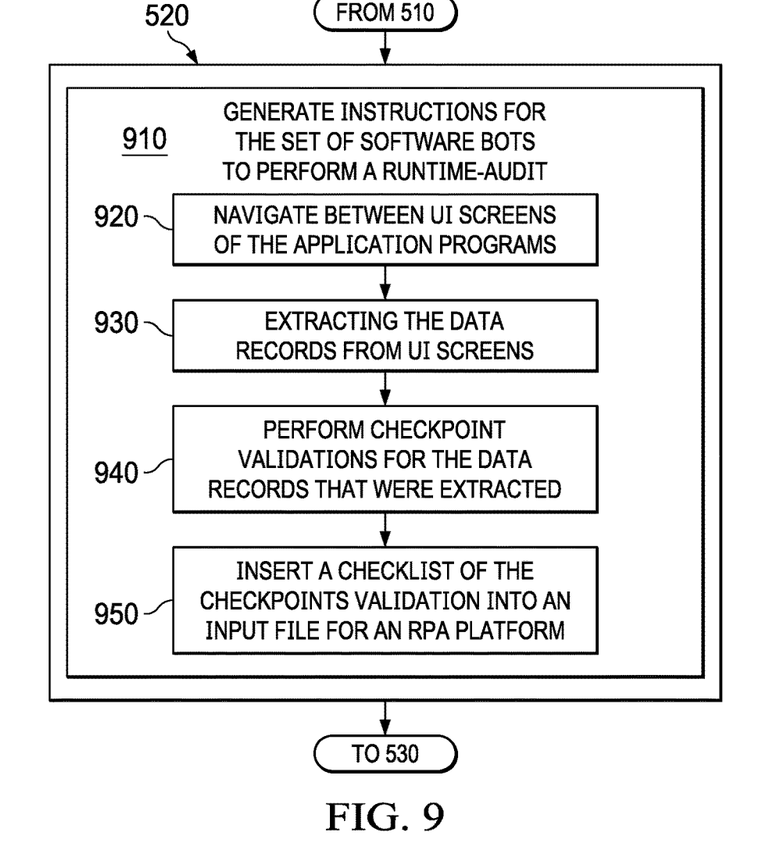
FIG. 9 is a flowchart of a process for validating policy compliance depicted in accordance with an illustrative embodiment.

With reference next to FIG. 9, a flowchart of a process for validating policy compliance is depicted in accordance with an illustrative embodiment. The process in FIG. 9 is an example one implementation for step 520 in FIG. 5.

Continuing from step 510 of FIG. 5, the process generates instructions for the set of software bots to interact with the set of application programs to performing a runtime-audit (step 910). In this illustrative example, the instructions for the software bots include navigating between UI screens of the application programs (step 920); extracting the data records from UI screens of the application programs (step 930); and performing checkpoint validations for the data records that were extracted (step 940).

The process inserts a checklist of the checkpoint validations into input file for an RPA platform (step 950). Thereafter, the process may proceed to step 530 of FIG. 5.

Figure 10:
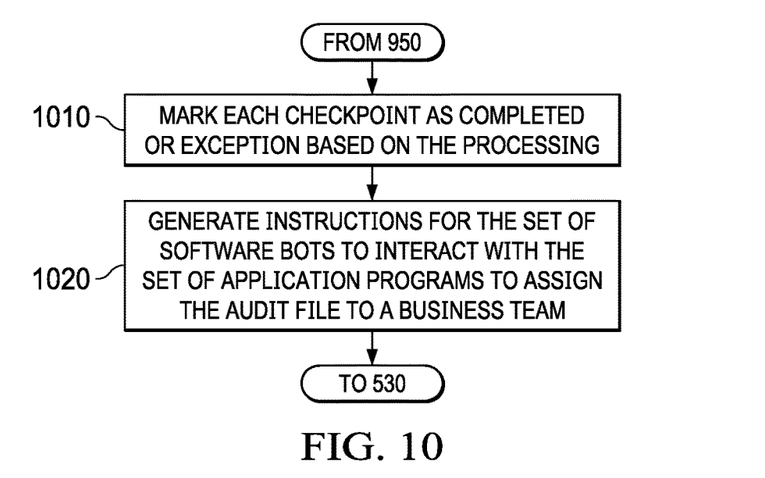
FIG. 10 is a flowchart of a process for validating policy compliance depicted in accordance with an illustrative embodiment.

With reference next to FIG. 10, a flowchart of a process for validating policy compliance is depicted in accordance with an illustrative embodiment. The process in FIG. 10 is an example of additional processing steps that can be performed in conjunction with the process of FIG. 5.

Continuing from step 530 of FIG. 5, the process marks each checkpoint as completed or exception based on the processing (step 1010). In response to successful validation, the process generates instructions for the set of software bots to interact with the set of application programs to assign the audit file to a user for manual review (step 1020). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
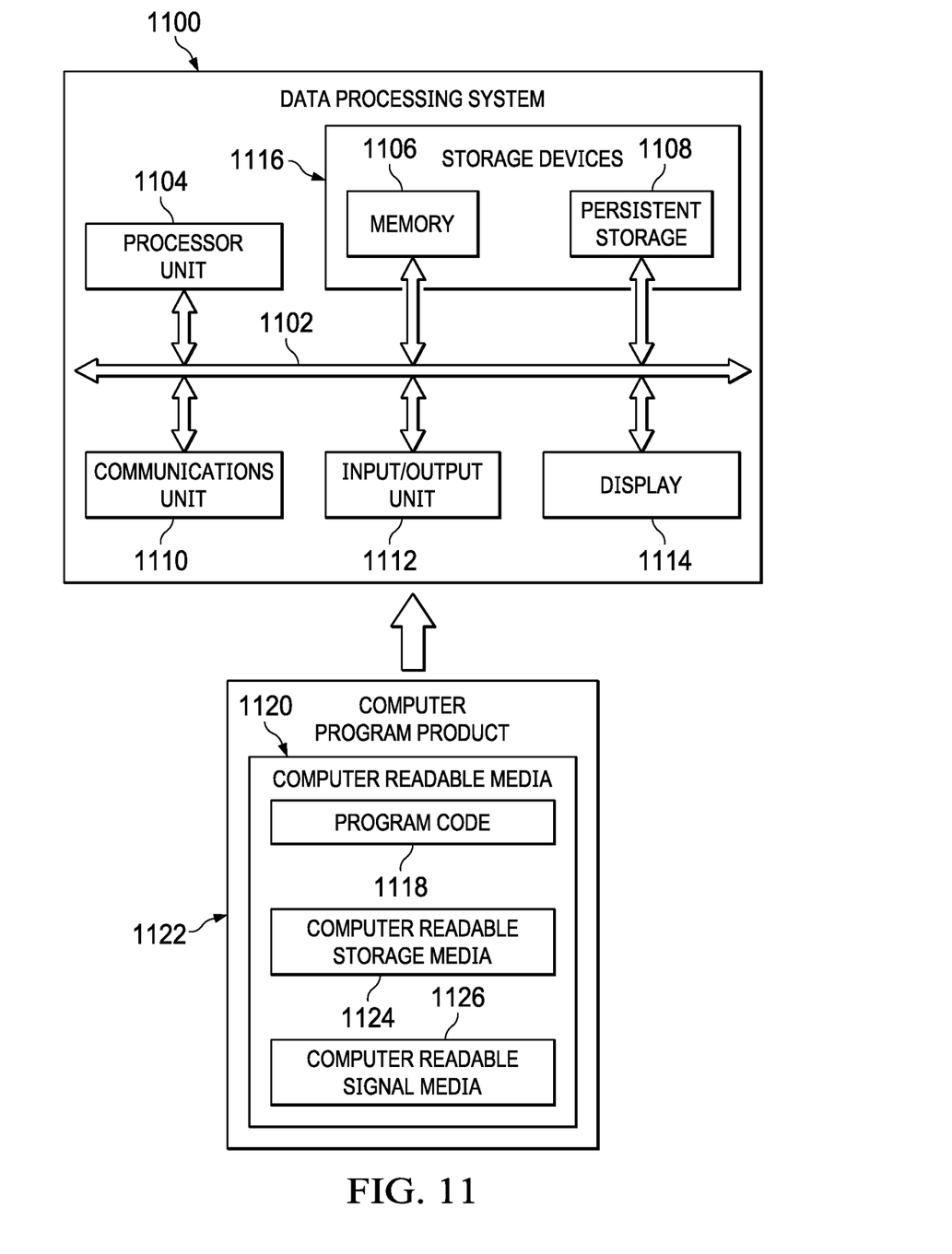
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 204 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are program instructions and are also referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible," as used herein, is a limitation of the medium itself (i.e., tangible, not a signal) as opposed to a limitation on data storage persistency (e.g., RAM vs. ROM).

Alternatively, program code 1118 can be transferred to data processing system 1100 using a computer-readable signal media. The computer-readable signal media are signals and can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, the illustrative embodiments of the present invention provide a computer-implemented method, computer system, and computer program product for automatic data retrieval and validation. A computer system generates an audit file including a set of data objects. The computer system validates the data objects with a compliance policy by deploying a set of software bots to interact at a user level with a set of application programs. In response to validating the data objects, the computer system reflects validation results into a user interface.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for automatic data retrieval and validation, the method comprising:

generating, by a computer system comprising one or more processors coupled with memory, an audit file including a set of data objects;

deploying, by the computer system, a set of software bots to interact at a user level with a set of application programs via one or more user interfaces of the set of application programs;

validating, by the computer system, the set of data objects with a compliance policy based at least in part on one or more interactions by the set of software bots with the set of application programs; and in response to validating the set of data objects, reflecting, by the computer system, validation results into a user interface.

2. The method of claim 1, wherein generating the audit file further comprises:

identifying, by the computer system, an audit request from a queue;

identifying, by the computer system, data elements in the audit request;

querying, by the computer system, at least one application program of the set of application programs for a set of data records, wherein each data record in the set of data records includes the data elements identified from the audit request; and packaging, by the computer system, the set of data records into an input file for a robotic process automation platform.

3. The method of claim 2, further comprising:

determining, by the computer system, whether an API is configured to perform one or more steps of identifying the audit request, identifying the data elements, querying the set of application programs, and packaging the set of data records; and in response to determining that the API is configured, issuing, by the computer system, a set of API calls to one or more application program of the set of application programs to perform the one or more steps.

4. The method of claim 2, further comprising:

determining, by the computer system, whether an API is configured to perform one or more steps of identifying the audit request, identifying the data elements, querying the set of application programs, and packaging the set of data records; and in response to determining that the API is not configured, generating, by the computer system, instructions for the set of software bots to interact with the set of application programs to perform the one or more steps.

5. The method of claim 2, wherein validating policy compliance further comprises:

generating instructions for the set of software bots to interact with the set of application programs to perform a pre-audit including:

querying, by the computer system, the set of application programs for the set of data records and reports that include the data elements identified from the audit request;

identifying, by the computer system, representative records based on different combinations of data dimensions querying, by the computer system, the set of application programs for data objects related to the representative records, validating, by the computer system, policy compliance of the data objects, and reflecting, by the computer system, compliance of the data objects into the user interface.

6. The method of claim 2, wherein validating policy compliance further comprises:

generating instructions for the set of software bots to interact with the set of application programs to perform a runtime-audit including:

navigating, by the computer system, between UI screens of the set of application programs;

extracting, by the computer system, the set of data records from UI screens;

performing, by the computer system, checkpoint validations for the set of data records that were extracted; and inserting, by the computer system, a checklist of the checkpoint validation into the input file for the robotic process automation platform.

7. The method of claim 6, further comprising:

marking, by the computer system, each checkpoint as completed or exception; and in response to successful validation, generating, by the computer system, instructions for the set of software bots to interact with the set of application programs to assign the audit file to a business team.

8. A computer system comprising:

a hardware processor; and a validation engine in the computer system for automatic data retrieval and validation, wherein the validation engine executes program code to perform a method of:

generating an audit file including a set of data objects;

deploying a set of software bots to interact at a user level with a set of application programs via one or more user interfaces of the set of application programs;

validating the set of data objects with a compliance policy based at least in part on one or more interactions by the set of software bots with the set of application programs; and in response to validating the set of data objects, reflecting validation results into a user interface.

9. The computer system of claim 8, wherein generating the audit file further comprises:

identifying an audit request from a queue identifying data elements in the audit request querying at least one application program of the set of application programs for a set of data records, wherein each data record in the set of data records includes the data elements identified from the audit request; and packaging the set of data records into an input file for a robotic process automation platform.

10. The computer system of claim 9, wherein the validation engine executes program code to perform the method of:

determining whether an API is configured to perform one or more steps of identifying the audit request, identifying the data elements, querying the set of application programs, and packaging the set of data records; and in response to determining that the API is configured, issuing a set of API calls to one or more application programs of the set of application programs to perform the one or more steps.

11. The computer system of claim 9, wherein the validation engine executes program code to perform the method of:

determining whether an API is configured to perform one or more steps of identifying the audit request, identifying the data elements, querying the set of application programs, and packaging the set of data records; and in response to determining that the API is not configured, generating instructions for the set of software bots to interact with the set of application programs to perform the one or more steps.

12. The computer system of claim 9, wherein validating policy compliance further comprises:
    generating instructions for the set of software bots to interact with the set of application programs to perform a pre-audit including:
        querying the set of application programs for the set of data records and reports that include the data elements identified from the audit request;
        identifying representative records based on different combinations of data dimensions
        querying the set of application programs for data objects related to the representative records;
        validating policy compliance of the data objects; and
        reflecting compliance of the data objects into the user interface.

13. The computer system of claim 9, wherein validating policy compliance further comprises:
    generating instructions for the set of software bots to interact with the set of application programs to performing a runtime-audit including:
        navigating between UI screens of the set of application programs;
        extracting the set of data records from UI screens;
        perform checkpoint validations for the set of data records that were extracted; and
        inserting a checklist of the checkpoints validation into the input file for the robotic process automation platform.

14. The computer system of claim 13, further comprising:
    marking each checkpoint as completed or exception; and
    in response to successful validation, generating instructions for the set of software bots to interact with the set of application programs to assign the audit file to a business team.

15. A computer program product comprising:
    a computer readable storage media; and
    program code, stored on the computer readable storage media, for automatic data retrieval and validation, and when executed, instruct a computer system to perform a method of:
    generating an audit file including a set of data objects;
    deploying a set of software bots to interact at a user level with a set of application programs via one or more user interfaces of the set of application programs;
    validating the set of data objects with a compliance policy based at least in part on one or more interactions by the set of software bots with the set of application programs; and
    in response to validating the set of data objects, reflecting validation results into a user interface.

16. A computer program product of claim 15, wherein generating the audit file further comprises:
    identify an audit request from a queue;
    identify data elements in the audit request;
    querying at least one application program of the set of application programs for a set of data records, wherein each data record in the set of data records includes the data elements identified from the audit request; and
    packaging the set of data records into an input file for a robotic process automation platform.

17. The computer program product of claim 16, further comprising:
    determining whether an API is configured to perform one or more steps of identifying the audit request, identifying the data elements, querying the set of application programs, and packaging the set of data records; and
    in response to determining that the API is configured, issuing a set of API calls to one or more of the set of application programs to perform the one or more steps.

18. The computer program product of claim 16, further comprising:
    determining whether an API is configured to perform one or more steps of identifying the audit request, identifying the data elements, querying the set of application programs, and packaging the set of data records; and
    in response to determining that the API is not configured, generating instructions for the set of software bots to interact with the set of application programs to perform the one or more steps.

19. The computer program product of claim 16, wherein validating policy compliance further comprises:
    generating instructions for the set of software bots to interact with the set of application programs to perform a pre-audit including:
        querying the set of application programs for the set of data records and reports that include the data elements identified from the audit request;
        identifying representative records based on different combinations of data dimensions;
        querying the set of application programs for data objects related to the representative records;
        validating policy compliance of the data objects; and
        reflecting compliance of the data objects into the user interface.

20. The computer program product of claim 16, wherein validating policy compliance further comprises:
    generating instructions for the set of software bots to interact with the set of application programs to performing a runtime-audit including:
        navigating between UI screens of the set of application programs;
        extracting the set of data records from UI screens;
        perform checkpoint validations for the set of data records that were extracted; and
        inserting a checklist of the checkpoints validation into the input file for the robotic process automation platform.

21. The computer program product of claim 20, further comprising:
    marking each checkpoint as completed or exception; and
    in response to successful validation, generating instructions for the set of software bots to interact with the set of application programs to assign the audit file to a business team.

* * * * *